United States Patent
Tian et al.

(10) Patent No.: US 10,748,013 B2
(45) Date of Patent: Aug. 18, 2020

(54) METHOD AND APPARATUS FOR DETECTING ROAD LANE

(71) Applicants: Neusoft Corporation, Shenyang (CN); Neusoft Reach Automotive Technology (Shanghai) Co., Ltd., Shanghai (CN)

(72) Inventors: Huan Tian, Shenyang (CN); Jun Hu, Shenyang (CN); Shuai Cheng, Shenyang (CN); Wei Liu, Shenyang (CN)

(73) Assignee: Neusoft Corporation, Shenyang (CN)

( * ) Notice: Subject to any disclaimer, the term of this patent is extended or adjusted under 35 U.S.C. 154(b) by 258 days.

(21) Appl. No.: 15/981,916

(22) Filed: May 17, 2018

(65) Prior Publication Data

US 2019/0163991 A1    May 30, 2019

(30) Foreign Application Priority Data

Nov. 30, 2017    (CN) .......................... 2017 1 1237254

(51) Int. Cl.
  *G06K 9/00* (2006.01)
  *G06N 3/04* (2006.01)
  *G06K 9/62* (2006.01)
  *G06K 9/46* (2006.01)

(52) U.S. Cl.
  CPC ....... *G06K 9/00798* (2013.01); *G06K 9/4628* (2013.01); *G06K 9/6202* (2013.01); *G06K 9/6274* (2013.01); *G06N 3/0454* (2013.01)

(58) Field of Classification Search
  CPC ............... G06N 3/0454; G06N 3/0445; G06K 9/00798; G06K 9/6274; G06K 9/4628; G06K 9/6202; G06T 7/10; G06T 7/11; G06T 2207/20084; G06T 2207/30256
  USPC ................ 382/156, 157, 158, 173, 180, 104
  See application file for complete search history.

(56) References Cited

U.S. PATENT DOCUMENTS 10,176,388 B1 * 1/2019 Ghafarianzadeh ..........................
G06K 9/00671

OTHER PUBLICATIONS

Fayyaz, Mohsen, et al. "STFCN: spatio-temporal fully convolutional neural network for semantic segmentation of street scenes." Asian Conference on Computer Vision. Springer, Cham, 2016. (Year: 2016).*

Garcia-Garcia, Alberto, et al. "A review on deep learning techniques applied to semantic segmentation." arXiv preprint arXiv: 1704. 06857 (2017). (Year: 2017).*

(Continued)

*Primary Examiner* — Geoffrey E Summers
(74) *Attorney, Agent, or Firm* — Kilpatrick Townsend & Stockton LLP (57) ABSTRACT

A method and an apparatus for detecting a road lane are provided. The method includes acquiring a current road image of a road around a vehicle and inputting the current road image into a deep learning model and detecting a road lane region in the current road image based on a result outputted from the deep learning model. The deep learning model includes a first model device and a second model device. The first model device includes at least one first model subdevice which includes a convolutional neural network and a first recurrent neural network, and the second model device includes at least one second model subdevice which includes a deconvolution neural network and a second recurrent neural network.

12 Claims, 7 Drawing Sheets

(56) References Cited

OTHER PUBLICATIONS

Li, Jun, et al. "Deep neural network for structural prediction and lane detection in traffic scene." IEEE transactions on neural networks and learning systems 28.3 (2016): 690-703. (Year: 2016).*

Noh, Hyeonwoo, Seunghoon Hong, and Bohyung Han. "Learning Deconvolution Network for Semantic Segmentation." 2015 IEEE International Conference on Computer Vision (ICCV). IEEE, 2015. (Year: 2015).*

Visin, Francesco, et al. "ReSeg: A Recurrent Neural Network-based Model for Semantic Segmentation." arXiv preprint arXiv: 1511.07053 (2015). (Year: 2015).*

Yan, Zhicheng, et al. "Combining the best of convolutional layers and recurrent layers: A hybrid network for semantic segmentation. " arXiv preprint arXiv:1603.04871 (2016). (Year: 2016).*

* cited by examiner

METHOD AND APPARATUS FOR DETECTING ROAD LANE

CROSS REFERENCE TO RELATED APPLICATION

The present application claims priority to Chinese Patent Application No. 201711237254.5, titled "METHOD AND APPARATUS FOR DETECTING ROAD LANE", filed on Nov. 30, 2017 with the State Intellectual Property Office of the PRC, which is incorporated herein by reference in its entirety.

FIELD

The present disclosure relates to the technical field of image processing, and in particular to a method and an apparatus for detecting a road lane.

BACKGROUND

With intelligent systems being applied to the field of vehicle driving, more and more vehicles are equipped with intelligent systems that enable automatic driving or assisted driving. In order to realize the automatic driving or assisted driving, the intelligent system on the vehicle usually needs to detect a road lane from a road image of a road around the vehicle, to determine a driving lane around the vehicle, so as to guide driving. A neural network, as a machine learning model, is applied to the road lane detection technology. However, in the detection schemes based on the neural network, not all road lanes can be accurately detected, and in particular, road lanes may not be accurately and effectively detected in case of incomplete road lanes, partially-occluded road lanes, or road lanes under a drastically light changing environment.

SUMMARY

A method and an apparatus for detecting a road lane are provided, with which an image feature of each pixel point in the road image can be preserved in the image processing, thereby road lanes such as an incomplete road lane, a partially-occluded road lane, or a road lane under a drastically light changing environment can be detected accurately and effectively.

In one embodiment, a method for detecting a road lane is provided according to an embodiment of the present disclosure. The method includes acquiring a current road image of a road around a vehicle; and inputting the current road image into a deep learning model and detecting a road lane region in the current road image based on a result outputted from the deep learning model, where the deep learning model is a model that has been trained based on correspondences between historical road images and known road lane regions in the historical road images, the deep learning model comprises a first model device and a second model device, and an output of the first model device serves as an input of the second model device, the first model device comprises at least one first model subdevice, the first model subdevice comprises a convolutional neural network and a first recurrent neural network, and an output of the convolutional neural network serves as an input of the first recurrent neural network, and the second model device comprises at least one second model subdevice, the second model subdevice comprises a deconvolution neural network and a second recurrent neural network, and an output of the deconvolution neural network serves as an input of the second recurrent neural network.

In some embodiments, each of the first recurrent neural network and the second recurrent neural network is a bidirectional long short-term memory network.

In some embodiments, for each pixel point in the current road image, a first sequence to be inputted into the first recurrent neural network is formed by an output result of the convolutional neural network for the pixel point and output results of the convolutional neural network for pixel points in a neighborhood of the pixel point, and for each pixel point in the current road image, a second sequence to be inputted into the second recurrent neural network is formed by an output result of the deconvolution neural network for the pixel point and output results of the deconvolution neural network for pixel points in a neighborhood of the pixel point.

In some embodiments, the deep learning model may further include a third recurrent neural network, a third sequence to be inputted into the third recurrent neural network is formed by results outputted by the second model device by processing a plurality of road images, where the plurality of road images comprise the current road image and road images recently acquired at different moments.

In another embodiment, an apparatus for detecting a road lane is provided according to an embodiment of the present disclosure. The apparatus includes an image acquiring device configured to acquire a current road image of a road around a vehicle, and a model processing device configured to input the current road image into a deep learning model and detecting a road lane region in the current road image based on a result outputted from the deep learning model, where the deep learning model is a model that has been trained based on correspondences between historical road images and known road lane regions in the historical road images, the deep learning model comprises a first model device and a second model device, and an output of the first model device serves as an input of the second model device, the first model device comprises at least one first model subdevice, the first model subdevice comprises a convolutional neural network and a first recurrent neural network, and an output of the convolutional neural network serves as an input of the first recurrent neural network, and the second model device comprises at least one second model subdevice, the second model subdevice comprises a deconvolution neural network and a second recurrent neural network, and an output of the deconvolution neural network serves as an input of the second recurrent neural network.

In some embodiments, each of the first recurrent neural network and the second recurrent neural network may be a bidirectional long short-term memory network.

In some embodiments, for each pixel point in the current road image, a first sequence to be inputted into the first recurrent neural network is formed by an output result of the convolutional neural network for the pixel point and output results of the convolutional neural network for pixel points in a neighborhood of the pixel point, and for each pixel point in the current road image, a second sequence to be inputted into the second recurrent neural network is formed by an output result of the deconvolution neural network for the pixel point and output results of the deconvolution neural network for pixel points in a neighborhood of the pixel point.

In some embodiments, the deep learning model may further include a third recurrent neural network, a third sequence to be inputted into the third recurrent neural network is formed by results outputted by the second model device by processing a plurality of road images, and the plurality of road images comprise the current road image and road images recently acquired at different moments.

In one embodiment, a device for detecting a road lane is provided according to an embodiment of the present disclosure. The device includes a processor, and a memory, where the memory is configured to store a program code and transmit the program code to the processor, and the processor is configured to execute, in response to an instruction in the program code, the method for detecting a road lane according to one embodiment.

In yet another embodiment, a storage medium according to an embodiment of the present disclosure. The storage medium is configured to store a program code for executing the method for detecting a road lane according to one embodiment.

According to the embodiments of the present disclosure, a road lane in the road image of a road around a vehicle is detected by a deep learning model. In addition to a convolutional neural network (CNN), a recurrent neural network (RNN) is also used in the deep learning model. Therefore, in the road image process by the recurrent neural network, an image feature based perception result is outputted for each pixel point in an input image, so that the image feature of each pixel point in a road image can be preserved and a spatial feature of a road lane in the road image can be extracted, and thus road lanes can be accurately and effectively detected even in case of incomplete road lanes, partially-occluded road lanes, or road lanes under a drastically light changing environment.

BRIEF DESCRIPTION OF THE DRAWINGS

In order to more clearly illustrate embodiments of the present disclosure, the drawings, which are to be used in the description of the embodiments, are briefly described below. It is apparent that, the drawings in the following description show only some embodiments of the present disclosure.

DETAILED DESCRIPTION OF EMBODIMENTS

A road image is processed by a convolutional neural network in a road image processing method. However, after the road image is processed by the convolutional neural network, a pixel size of the road image is reduced, and thus a part of image features of the image are lost. In one embodiment, in the road image process by the convolutional neural network, the convolutional neural network outputs one image feature result for an image region including multiple pixel points in an input image, for characterizing the image feature of the image region. For example, for an image region including 9 pixel points in an image inputted into the convolutional neural network, the convolutional neural network, after processing the image region, will output only an image feature of one point, to present the image feature of the image region. In this way, if the input image originally has image features of 9×n pixel points, the image outputted by the convolutional neural network after processing only has image features of n points, that is, the pixel size of the input image is reduced by 9 times. Thus, in the road image process by the convolutional neural network, an image feature may not be outputted for each pixel point. In this case, some image information will be lost during the road image processing, which will result in inaccurate lane information identified from the road image by the convolutional neural network. A recurrent neural network can output an image feature result for each pixel point in processing a road image. In this case, the pixel size of the image outputted by the recurrent neural network after processing remains unchanged compared with that of the input image, thereby avoiding image information losing, which compensates deficiencies of the convolutional neural network.

In view of above, a road lane in a road image of a road around a vehicle is detected by a deep learning model according to an embodiment of the present disclosure. In addition to a convolutional neural network, a recurrent neural network is also used in the deep learning model. Therefore, in the road image process by the recurrent neural network, an image feature based perception result is outputted for each pixel point in an input image, so that the image feature of each pixel point in a road image can be preserved and a spatial feature of a road lane in the road image can be extracted, and thus road lanes can be accurately and effectively detected even in case of incomplete road lanes, partially-occluded road lanes, or road lanes under a drastically light changing environment.

Figure 1:
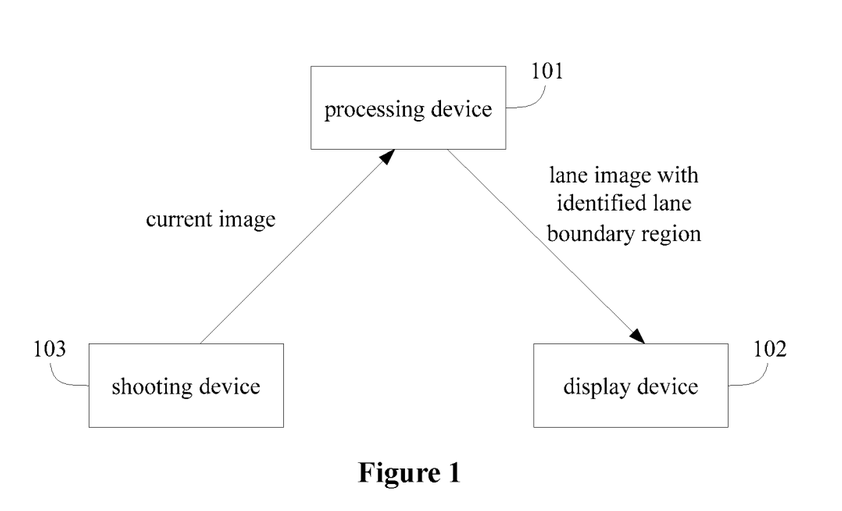
FIG. 1 is a schematic diagram of a framework of a system related to an application scenario according to an embodiment of the present disclosure.

A scenario according to an embodiment of the present disclosure may be a system as shown in FIG. 1. The system may be, for example, a driving assistance system. In one embodiment, the system may be, for example, an automatic detection system for a lane. The system includes a processing device 101, a display device 102 and a shooting device 103. In the system, the shooting device 103 may shoot to acquire a current road image of a lane and transmit the current road image to the processing device 101. The processing device 101 may input the current road image into a deep learning model and determine a road lane region in the current road image based on a result outputted from the deep learning model. The processing device 101 may then identify the determined road lane region on the current road image and transmit the current road image with the identified road lane region to the display device 102 for display.

It should be noted that the application scenario is shown merely for ease of understanding the present disclosure, which is not limited in the embodiment of the present disclosure. The embodiment of the present disclosure may be applied to any applicable scenarios.

Figure 2:
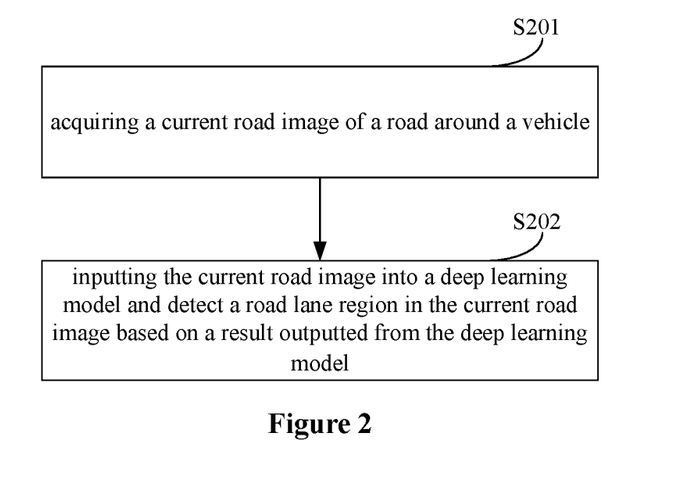
FIG. 2 is a schematic flowchart of a method for detecting a road lane according to an embodiment of the present disclosure.

Reference is made to FIG. 2, which is a schematic flowchart of a method for detecting a road lane according to an embodiment of the present disclosure. The method for detecting a road lane according to the embodiment includes the following S201 to S202.

In S201, a current road image of a road around a vehicle is acquired.

In this embodiment, a current road around a vehicle may be captured by a forward-facing camera on the vehicle, and an image captured by the camera may be acquired and used as the current road image of the road around the vehicle.

Since the coverage of the forward-facing camera of the vehicle is usually large, the amount of data of the road image to be processed is large if the entire road image captured by the camera is processed, which affects processing speed. In addition, it is of no great significance to process road image contents far away from the current position of the vehicle. In view of this, in a possible implementation, the current road image of the road around the vehicle may be acquired by the following steps A to B.

In step A, a current surrounding image captured by a camera of a vehicle is acquired.

In step B, an image of a preset region in front of the vehicle is intercepted from the current surrounding image and used as the current road image.

As an example, the preset region in front of the vehicle may be a rectangular region directly in front of the vehicle, and a length and a width of the rectangular region may be determined according to actual situations. For example, the length of the rectangular region is determined based on a current driving speed of the vehicle, and the width of the rectangular region is determined based on a width of the body of the vehicle. In addition, the preset region in front of the vehicle may be a region in other shapes, which is not limited in the embodiment.

In S202, the current road image is inputted into a deep learning model, and a road lane region in the current road image is detected based on a result outputted from the deep learning model.

It should be noted that the deep learning model according to the embodiment is a model that has been trained based on correspondences between historical road images and known road lane regions in the historical road images. That is, the deep learning model has been trained based on a large amount of historical data, and the deep learning model, into which the current road image is inputted, can output a result and thus road lane information of the current road image can be determined based on the result.

It should be noted that after the current road image is inputted into the deep learning model, the deep learning model can extract an image feature of each pixel point based on the current road image, that is, output a result for each pixel point, and the road lane information of the current road image can be determined based on the output results for each pixel point. It should be understood that the result outputted from the deep learning model for each pixel point may indicate whether the pixel point is a point in the road lane region. An output result for a pixel point i may be represented by P(i). For example, P(i)=A indicates that the pixel point i is a point in the road lane region, and P(i)=B indicates that the pixel point i is a point outside the road lane region, where A≠B. As another example, P(i)∈[C, D] indicates that the pixel point i is a point in the road lane region, and P(i)∉[C, D] indicates that the pixel point i is a point outside the road lane region, where C and D are preset values.

In this embodiment, both a convolutional neural network and a recurrent neural network are adopted in the deep learning model, to avoid losing image information in the current road image process. In this way, although the image information is lost in the image processing by the convolutional neural network, the image information can be preserved in the image processing by the recurrent neural network. Therefore, all image information in the current road image can be processed by the neural networks, and the detection result of the road lane in the current road image is accurate.

Figure 3A:
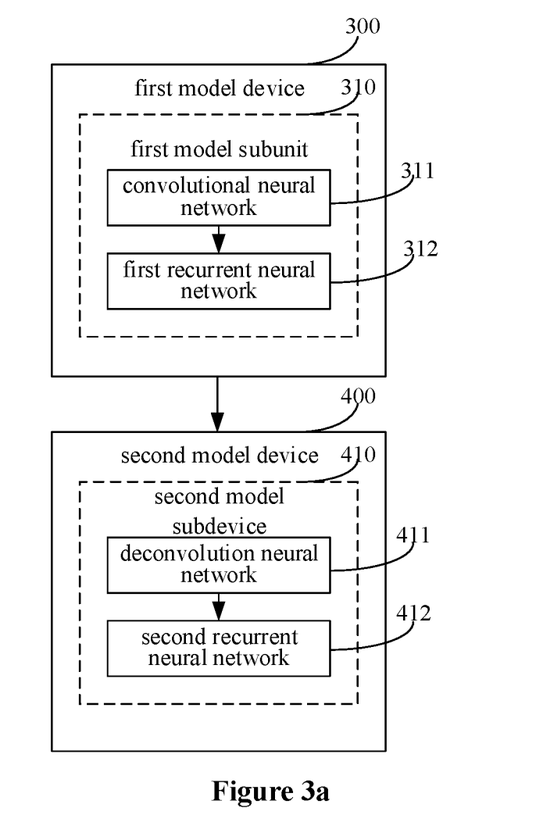
FIG. 3a is a schematic diagram of a structure of a deep learning model according to an embodiment of the present disclosure.
Figure 3B:
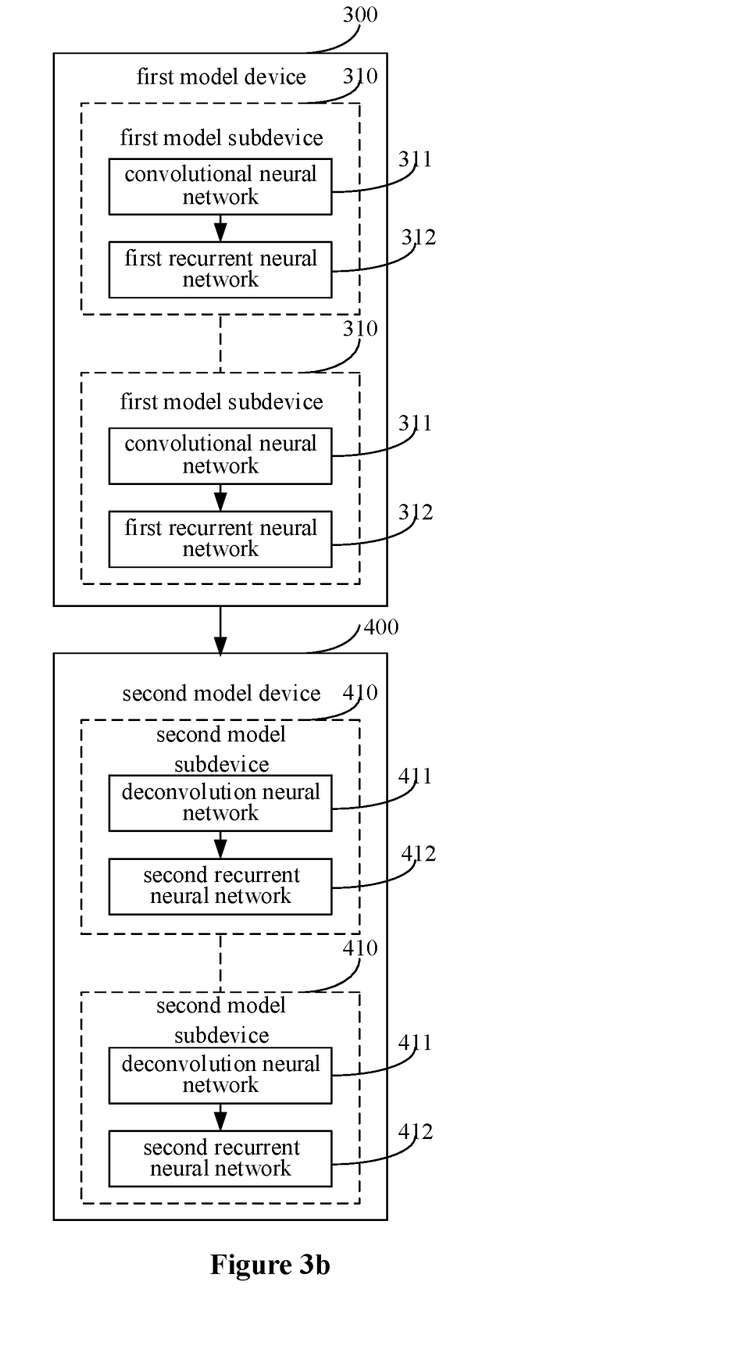
FIG. 3b is a schematic diagram of another structure of a deep learning model according to an embodiment of the present disclosure.

For example, references are made to FIG. 3a and FIG. 3b, which are schematic diagrams of two exemplary structures of a deep learning model according to the embodiments. In both structures, the deep learning model includes a first model device 300 and a second model device 400, and an output of the first model device 300 serves as an input of the second model device 400.

It should be noted that, data to be inputted into the first model device 300 may be a current road image of a vehicle, and a result outputted by the first model device 300 by processing the road image is inputted into the second model device 400. The second model device 400, after processing the result outputted by the first model device 300, outputs a processing result. The processing result may be the output of the deep learning model, for determining a road lane region in the current road image.

The first model device 300 includes at least one first model subdevice 310. The first model subdevice includes a convolutional neural network 311 and a first recurrent neural network 312. An output of the convolutional neural network 311 serves as an input of the first recurrent neural network 312.

The second model device 400 includes at least one second model subdevice 410. The second model subdevice includes a deconvolution neural network 411 and a second recurrent neural network 412. An output of the deconvolution neural network 411 serves as an input of the second recurrent neural network 412.

In this embodiment, a current road image of the vehicle is processed by the first model device 300 with a combination of a convolutional neural network and a first recurrent neural network, and the output of the first model device 300 is further processed by the second model device 400 with a combination of a deconvolution neural network and a second recurrent neural network.

It should be understood that the first model device 300 includes at least one group of a convolutional neural networks 311 and a first recurrent neural network 312, i.e., including at least one first model subdevice 310. That is, the first model device 300 may include only one first model subdevice 310, as shown in FIG. 3a. Alternatively, the first model device 300 may include multiple first model subdevices 310, as shown in FIG. 3b.

In this embodiment, after the current road image is inputted into the deep learning model, a result for indicating whether each pixel point in the current road image is located in a road lane region is required to be outputted by the deep learning model. Therefore, after the image is processed by the deep learning model, the pixel size of the processed image is required to be unchanged. Therefore, both a convolutional neural network 311 and a deconvolution neural network 411 are adopted in the deep learning model. The image is firstly processed by the convolutional neural network 311, and the pixel size of the processed image is reduced. The image is then processed by the deconvolution neural network 411, and the pixel size of the processed image is enlarged. In this way, the image after the image processing by the deep learning model and the image originally inputted into the deep learning model have the same pixel size, and the result for indicating whether a pixel point in the current road image is located in the road lane region can be acquired for each pixel point in the current road image.

It should be noted that each of the first recurrent neural network 312 in the first model device 300 and the second recurrent neural network 412 in the second model device 400 may be any recurrent neural network. A difference between the first recurrent neural network 312 and the second recurrent neural network 412 is that the input of the first recurrent neural network 312 is the output of the convolutional neural network 311 and the input of the second recurrent neural network 412 is the output of the deconvolution neural network 411. As an example, each of the first recurrent neural network 312 and the second recurrent neural network 412 may be a bidirectional long short-term memory (LSTM) network. With the bidirectional LSTM network, a spatial feature of each pixel point in the road image can be preserved well, so that the detected road lane region is accurate.

It should be understood that a structure and a processing manner of the first model device 300 are similar to those of the second model device 400. A difference is that the convolutional neural network 311 in the first model device 300 is replaced with the deconvolution neural network 411 in the second model device 400. The structure and the processing manner of the first model device 300 are described below as an example.

In the first model device 300, an input image of the first model device 300 is inputted into the convolutional neural network 311 to be processed by the convolutional neural network 311 to obtain a first output result, and the first output result of the convolutional neural network 311 is further processed by the first recurrent neural network 312 to obtain a second output result.

Figure 4:
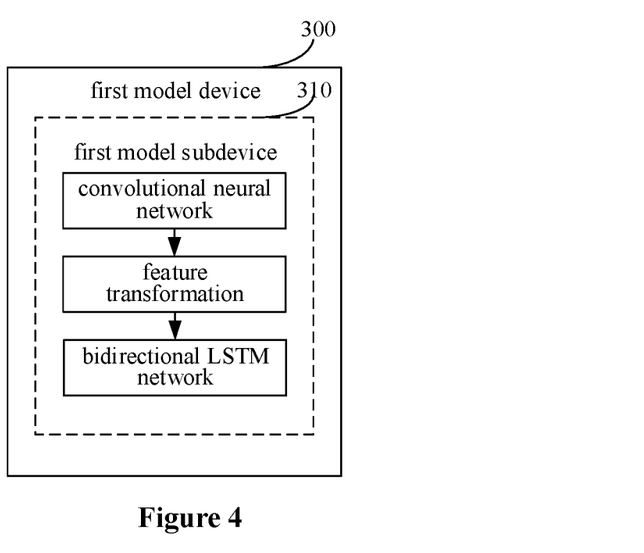
FIG. 4 is a schematic diagram illustrating feature transformation that performed on an output result of a convolutional neural network according to an embodiment of the present disclosure.

It should be noted that an input variable of a recurrent neural network is usually a sequence including at least one element. In view of this, a feature transformation process may be adopted between the convolutional neural network 311 and the first recurrent neural network 312 in the first model device 300, as shown in FIG. 4. In the feature transformation process, a sequence may be formed by output results of the convolutional neural network 311 for each pixel points according to a rule, and then the sequence is inputted into the first recurrent neural network 312. The sequence may include output results of the convolutional neural network 311 for multiple pixel points.

As an example, the feature transformation process may be as follows. In the first model subdevice 310, a first sequence to be inputted into the first recurrent neural network 312 is formed for each pixel point by an output result of the convolutional neural network 311 for the pixel point and output results of the convolutional neural network 311 for pixel points in a neighborhood of the pixel point. For example, in a case where there are eight pixel points in a neighborhood of each pixel point, a first sequence is formed for each pixel point by an output result of the convolutional neural network 311 for the pixel point and output results of the convolutional neural network 311 for the eight pixel points in the neighborhood of the pixel point. As an example, in a case where output results of the convolutional neural network 311 for pixel points a, b, c, d, e, f, g, h, i are acquired, where the pixel points b, c, d, e, f, g, h, i are all pixel points in a neighborhood of the pixel point a, the first sequence X=[A, B, C, D, E, F, G, H, I] may be formed by the output results of the convolutional neural network 311 for the pixel points a, b, c, d, e, f, g, h, i. The first sequence may serve as an input of the first recurrent neural network 312. In the first sequence, A represents the output result of the convolutional neural network 311 for the pixel point a, B represents the output result of the convolutional neural network 311 for the pixel point b, C represents the output result of the convolutional neural network 311 for the pixel point c, D represents the output result of the convolutional neural network 311 for the pixel point d, E represents the output result of the convolutional neural network 311 for the pixel point e, F represents the output result of the convolutional neural network 311 for the pixel point f, G represents the output result of the convolutional neural network 311 for the pixel point g, H represents the output result of the convolutional neural network 311 for the pixel point h, and I represents the output result of the convolutional neural network 311 for the pixel point i.

It should be noted that, output results for pixel points in each first sequence may be ranked according to a fixed rule, to effectively preserve the spatial feature of each pixel point. The fixed rule indicates that a fixed correspondence between rank of output results for pixel points and positions of the pixel points. Therefore, positions of the pixel points in the image corresponding to the output results can be determined based on the rank of the output results in the first sequence, to restore the spatial feature of each pixel point, and thus the spatial feature of the current road image can be presented.

For example, there are two different first sequences M and N. The first sequence M includes output results for pixel points in an image region 1, i.e., an output result A1 for a pixel point a1, an output result B1 for a pixel point b1, an output result C1 for a pixel point c1 and an output result D1 for a pixel point d1. The first sequence N includes output results for pixel points in an image region 2, i.e., an output result A2 for a pixel point a2, an output result B2 for a pixel point b2, an output result C2 for a pixel point c2 and an output result D2 for a pixel point d2. In the image region 1, the pixel point a1 is located in the upper left corner, the pixel point b1 is located in the upper right corner, the pixel point c1 is located in the lower left corner, and the pixel point d1 is located in the lower right corner. In the image region 2, the pixel point a2 is located in the upper left corner, the pixel point b2 is located in the upper right corner, the pixel point c2 is located in the lower left corner, and the pixel point d2 is located in the lower right corner. The output results for the pixel points in the first sequence M may be ranked as A1→B1→C1→D1, that is, the first sequence M is [A1, B1, C1, D1]. The output results for the pixel points in the first sequence N may be ranked as A2→B2→C2→D2, that is, the first sequence N is [A2, B2, C2, D2]. In this case, position correspondence among pixel points corresponding to the rank of the output results for the pixel points in the first sequence M is the same as that of the first sequence N, and the position correspondence is fixed, i.e., the upper left corner of the image region→the upper right corner of the image region→the lower left corner of the image region→the lower right corner of the image region.

Figure 5:
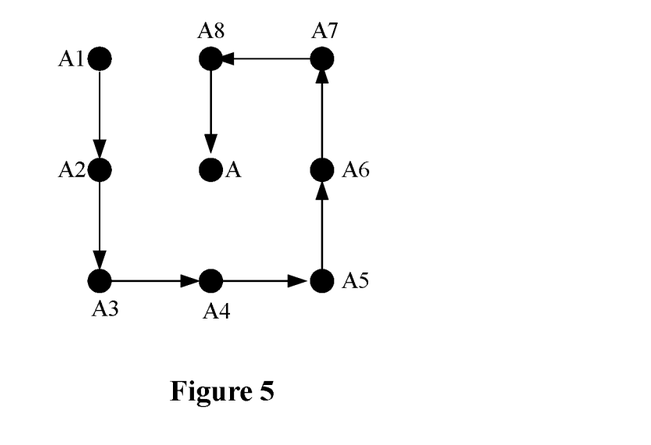
FIG. 5 is a schematic diagram of a first sequence forming for a pixel point A according to an embodiment of the present disclosure.

As an example, for a first sequence for a pixel point A formed by output results for nine pixel points, the rank of the output results in the first sequence for the pixel point A may be fixed as: an output result of the convolutional neural network for a pixel point located in the upper left corner in a neighborhood of the pixel point A, an output result of the convolutional neural network for a pixel point located in the middle of the left side in the neighborhood of the pixel point A, an output result of the convolutional neural network for a pixel point located in the lower left corner in the neighborhood of the pixel point A, an output result of the convolutional neural network for a pixel point located in the middle of the lower side in the neighborhood of the pixel point A, an output result of the convolutional neural network for a pixel point located in the lower right corner in the neighborhood of the pixel point A, an output result of the convolutional neural network for a pixel point located in the middle of the right side in the neighborhood of the pixel point A, an output result of the convolutional neural network for a pixel point located in the upper right corner in the neighborhood of the pixel point A, an output result of the convolutional neural network for a pixel point located in the middle of the upper side in the neighborhood of the pixel point A, and an output result of the convolutional neural network for the pixel point A.

For example, an example of forming a first sequence for a pixel point A and pixel points A1 to A8 in a neighborhood of the pixel point A is shown in FIG. 5. In the first sequence, the rank of output results of the pixel points is A1→A2→A3→A4→A5→A6→A7→A8→A, that is, the first sequence may be [A1, A2, A3, A4, A5, A6, A7, A8, A].

It should be understood that, a feature transformation process may also be adopted between the deconvolution neural network 411 and the second recurrent neural network 412 in the second model device 400, which is similar to the first model device 300. For example, the feature transformation process may be as follows. For each pixel point, a second sequence to be inputted into the second recurrent neural network 412 is formed by an output result of the deconvolution neural network 411 for the pixel point and output results of the deconvolution neural network 411 for pixel points in a neighborhood of the pixel point.

It should be noted that, output results for pixel points in the second sequence may also be ranked according to the fixed rule, which is similar to the first sequence, to effectively preserve the spatial feature of each pixel point. As an example, for a second sequence for a pixel point A formed by output results for nine pixel points, the rank of the output results in the second sequence for the pixel point A may be fixed as: an output result of the deconvolution neural network for a pixel point located in the upper left corner in a neighborhood of the pixel point A, an output result of the deconvolution neural network for a pixel point located in the middle of the left side in the neighborhood of the pixel point A, an output result of the deconvolution neural network for a pixel point located in the lower left corner in the neighborhood of the pixel point A, an output result of the deconvolution neural network for a pixel point located in the middle of the lower side in the neighborhood of the pixel point A, an output result of the deconvolution neural network for a pixel point located in the lower right corner in the neighborhood of the pixel point A, an output result of the deconvolution neural network for a pixel point located in the middle of the right side in the neighborhood of the pixel point A, an output result of the deconvolution neural network for a pixel point located in the upper right corner in the neighborhood of the pixel point A, an output result of the deconvolution neural network for a pixel point located in the middle of the upper side in the neighborhood of the pixel point A, and an output result of the deconvolution neural network for the pixel point A.

In order to make the result outputted from the deep learning model according to the embodiment more accurate, a road lane region in the current road image may be determined based on a processing result of the deep learning model obtained by processing the current road image in combination with processing results of the deep learning model obtained by processing road images collected during a time period before a moment at which the current road image is collected, so that the road lane region can be detected based on multiple road images collected at multiple moments during a time period, thereby avoiding possible error due to detecting the road lane region based on a single road image, and thus detecting the road lane region more accurately.

Figure 6:
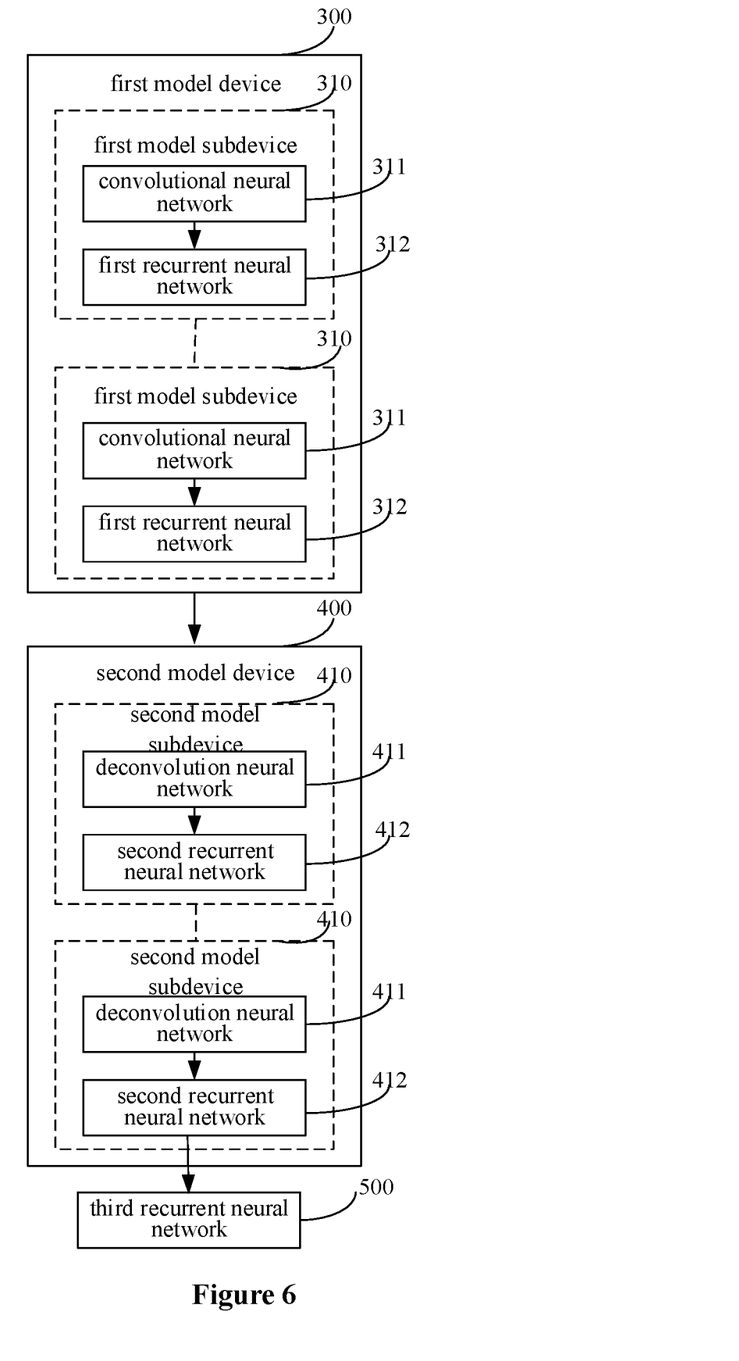
FIG. 6 is a schematic diagram of another structure of a deep learning model according to an embodiment of the present disclosure.

In order to detect a road lane region in combination with road images obtained at multiple moments, the deep learning model may further include a third model device 500 which includes a third recurrent neural network, as shown in FIG. 6. For the current road image and multiple road images recently acquired at different moments, a third sequence to be inputted into the third recurrent neural network is formed by results outputted by the second model device 400 by processing the current road image and the multiple road images recently acquired at different moments. The third recurrent neural network may be a bidirectional LSTM network, which is similar to the first recurrent neural network 312 and the second recurrent neural network 412.

Figure 7:
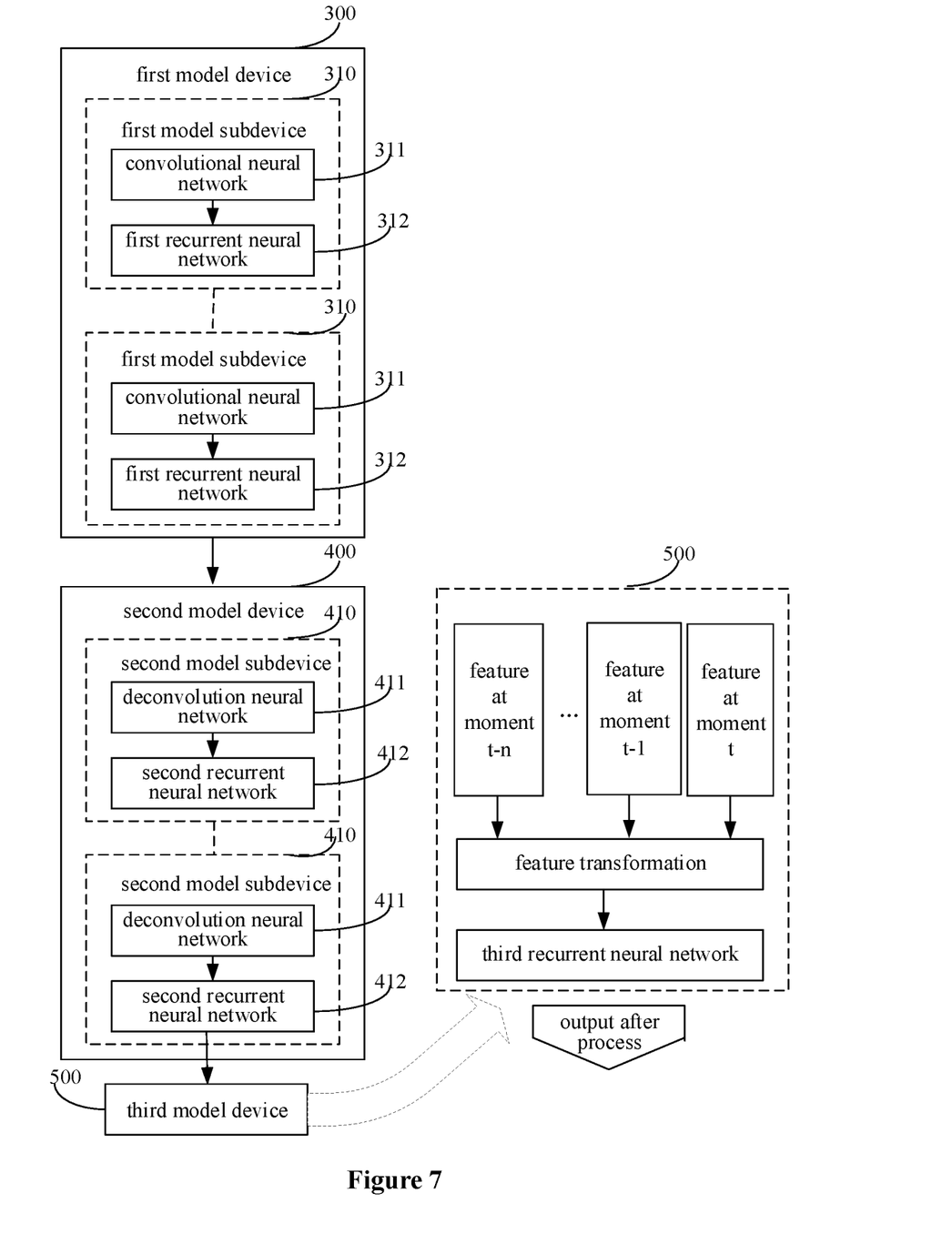
FIG. 7 is a schematic diagram illustrating feature transformation for a third recurrent neural network according to an embodiment of the present disclosure.

It should be understood that, an input variable of the third recurrent neural network may also be a sequence including at least one element, which is similar to the first recurrent neural network 312 and the second recurrent neural network 412. In view of this, a feature transformation process may be adopted in the third model device 500 in the deep learning model, as shown in FIG. 7. In the feature transformation process, a sequence may be formed by output results of the second model device 400 for a same pixel point in multiple road images collected at different moments, and the sequence is then inputted into the third recurrent neural network (e.g., the bidirectional LSTM network). A road lane region in the current road image is determined based on the output result of the third recurrent neural network.

In an implementation, the deep learning model is expressed by the following expression:

$$P_t(i) = F_{LSTM}\left(\sum_{k=1}^{n} M_i^{t=k}\right)$$

$$M_i^t = \sum F_{BiLSTM}(F_{CNN}(I))$$

where P represents an output result of the deep learning model for a road image acquired at a moment of t, i represents a pixel point, t and k each represents a moment. $P_t(i)$ represents results outputted by the third recurrent neural network by processing $M_i^{t=k}$ respectively corresponding to moments of t=1 to n. It can be seen that $P_t(i)$ is a result outputted by the deep learning model by processing the pixel point i in a road image acquired at a moment of n, and the result indicates whether the pixel point i in the road image is located in the road lane region. In addition, $M_i^t$ represents an output result of the second model device for a pixel point i in a road image acquired at a moment of t (t=1, 2, 3, . . . n), that is, $M_i^t$ is an image feature of a pixel point i in a road image acquired at a moment of t, which is extracted by the first model device and the second model device, and I represents the inputted current road image.

F is a variation function. For example, $F_{BiLSTM}$ represents a bidirectional LSTM, and $F_{CNN}$ represents a convolutional neural network.

With the method for detecting a road lane according the embodiment of the present disclosure, a road lane in a road image of a road around a vehicle is detected by a deep learning model. In addition to a convolutional neural network, a recurrent neural network is also used in the deep learning model. Therefore, in the road image process by the recurrent neural network, an image feature result is outputted for each pixel point in an input image, so that the image feature of each pixel point in a road image can be preserved and a spatial feature of a road lane in the road image can be extracted, and thus road lanes can be accurately and effectively detected even in case of incomplete road lanes, partially-occluded road lanes, or road lanes under a drastically light changing environment.

Figure 8:
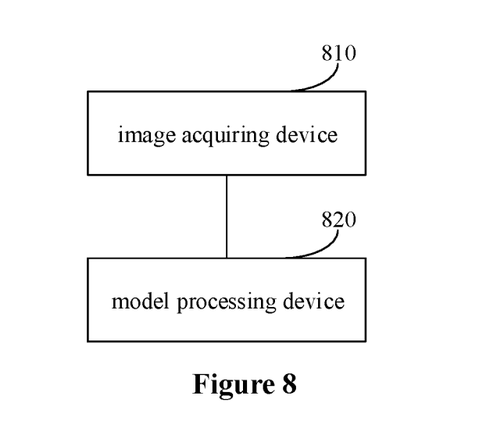
FIG. 8 is a schematic diagram of a structure of an apparatus for detecting a road lane according to an embodiment of the present disclosure.

Reference is made to FIG. 8, which is a schematic diagram of a structure of an apparatus for detecting a road lane according to an embodiment of the present disclosure. For example, the apparatus may include an image acquiring device 810 and a model processing device 820.

The image acquiring device 810 is configured to acquire a current road image of a road around a vehicle.

The model processing device 820 is configured to input the current road image into a deep learning model and detect a road lane region in the current road image based on a result outputted from the deep learning model.

The deep learning model is a model that has been trained based on correspondences between historical road images and known road lane regions in the historical road images.

The deep learning model includes a first model device and a second model device, and an output of the first model device serves as an input of the second model device.

The first model device includes at least one first model subdevice, the first model subdevice includes a convolutional neural network and a first recurrent neural network, and an output of the convolutional neural network serves as an input of the first recurrent neural network.

The second model device includes at least one second model subdevice, the second model subdevice includes a deconvolution neural network and a second recurrent neural network, and an output of the deconvolution neural network serves as an input of the second recurrent neural network.

In some embodiments, each of the first recurrent neural network and the second recurrent neural network is a bidirectional long short-term memory network.

In some embodiments, in the first model subdevice, for each pixel point in the current road image, a first sequence to be inputted into the first recurrent neural network is formed by an output result of the convolutional neural network for the pixel point and output results of the convolutional neural network for pixel points in a neighborhood of the pixel point.

In the second model subdevice, for each pixel point in the current road image, a second sequence to be inputted into the second recurrent neural network is formed by an output result of the deconvolution neural network for the pixel point and output results of the deconvolution neural network for pixel points in a neighborhood of the pixel point.

In some embodiments, the rank of output results in the first sequence for a pixel point A may be: an output result of the convolutional neural network for a pixel point located in the upper left corner in a neighborhood of the pixel point A, an output result of the convolutional neural network for a pixel point located in the middle of the left side in the neighborhood of the pixel point A, an output result of the convolutional neural network for a pixel point located in the lower left corner in the neighborhood of the pixel point A, an output result of the convolutional neural network for a pixel point located in the middle of the lower side in the neighborhood of the pixel point A, an output result of the convolutional neural network for a pixel point located in the lower right corner in the neighborhood of the pixel point A, an output result of the convolutional neural network for a pixel point located in the middle of the right side in the neighborhood of the pixel point A, an output result of the convolutional neural network for a pixel point located in the upper right corner in the neighborhood of the pixel point A, an output result of the convolutional neural network for a pixel point located in the middle of the upper side in the neighborhood of the pixel point A, and an output result of the convolutional neural network for the pixel point A.

The rank of output results in the second sequence for a pixel point A may be: an output result of the deconvolution neural network for a pixel point located in the upper left corner in a neighborhood of the pixel point A, an output result of the deconvolution neural network for a pixel point located in the middle of the left side in the neighborhood of the pixel point A, an output result of the deconvolution neural network for a pixel point located in the lower left corner in the neighborhood of the pixel point A, an output result of the deconvolution neural network for a pixel point located in the middle of the lower side in the neighborhood of the pixel point A, an output result of the deconvolution neural network for a pixel point located in the lower right corner in the neighborhood of the pixel point A, an output result of the deconvolution neural network for a pixel point located in the middle of the right side in the neighborhood of the pixel point A, an output result of the deconvolution neural network for a pixel point located in the upper right corner in the neighborhood of the pixel point A, an output result of the deconvolution neural network for a pixel point located in the middle of the upper side in the neighborhood of the pixel point A, and an output result of the deconvolution neural network for the pixel point A.

In some embodiments, the deep learning model may further include a third recurrent neural network.

A third sequence to be inputted into the third recurrent neural network is formed by results outputted by the second model device by processing a plurality of road images, where the plurality of road images include the current road image and road images recently acquired at different moments.

In some embodiments, the image acquiring device 810 may include an acquiring subdevice and an intercepting subdevice.

The acquiring subdevice is configured to acquire a current surrounding image captured by a camera on a vehicle.

The intercepting subdevice is configured to intercept an image of a preset region in front of the vehicle from the current surrounding image as the current road image.

With the apparatus for detecting a road lane according to the embodiment, a road lane in a road image of a rod around a vehicle is detected by a deep learning model. In addition to a convolutional neural network, a recurrent neural network is also used in the deep learning model. Therefore, in the road image process by the recurrent neural network, an image feature result is outputted for each pixel point in an input image, so that the image feature of each pixel point in a road image can be preserved and a spatial feature of a road lane in the road image can be extracted, and thus road lanes can be accurately and effectively detected even in case of incomplete road lanes, partially-occluded road lanes, or road lanes under a drastically light changing environment.

Figure 9:
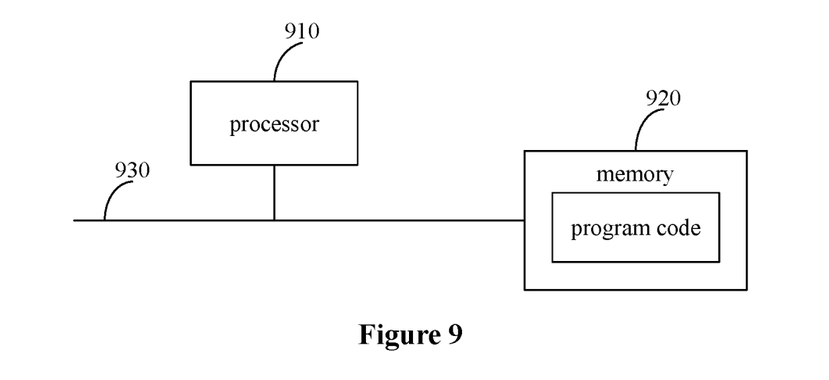
FIG. 9 is a schematic diagram of a structure of a device for detecting a road lane according to an embodiment of the present disclosure.

Reference is made to FIG. 9, which is a schematic diagram of a structure of a device for detecting a road lane according to an embodiment of the present disclosure. The device includes a processor 910 and a memory 920.

The memory 920 is configured to store a program code and transmit the program code to the processor 910 via a communications bus 930.

The processor 910 is configured to execute, in response to an instruction in the program code, the method for detecting a road lane according to any one of the above embodiments of the present disclosure.

In addition, a storage medium is further provided according an embodiment of the present disclosure. The storage medium is configured to store a program code for executing the method for detecting a road lane according to any one of the above embodiments of the present disclosure.

It should be noted that relationship terminologies such as "first", "second" are only used herein to distinguish one entity or operation from another, rather than to necessitate or imply that the actual relationship or order exists between the entities or operations. Furthermore, terms of "include", "comprise" or any other variants are intended to be non-exclusive. Therefore, a process, method, article or device including multiple elements includes not only the elements but also other elements that are not enumerated, or also include the elements inherent for the process, method, article or device. Unless expressively limited otherwise, the statement "comprising (including) one . . . " does not exclude the case that other similar elements may exist in the process, method, article or device.

The invention claimed is:

1. A method for detecting a road lane, comprising:
   acquiring a current road image of a road in proximity of a vehicle; and
   inputting the current road image into a deep learning model and detecting a road lane region in the current road image based on a result outputted from the deep learning model,
   wherein the deep learning model is a model that has been trained based on correspondences between historical road images and known road lane regions in the historical road images,
   wherein the deep learning model comprises a first model device and a second model device, and an output of the first model device serves as an input of the second model device,
   wherein the first model device comprises at least one first model subdevice, the first model subdevice comprises a convolutional neural network and a first recurrent neural network, and an output of the convolutional neural network serves as an input of the first recurrent neural network, and
   wherein the second model device comprises at least one second model subdevice, the second model subdevice comprises a deconvolution neural network and a second recurrent neural network, and an output of the deconvolution neural network serves as an input of the second recurrent neural network.

2. The method according to claim 1, wherein each of the first recurrent neural network and the second recurrent neural network is a bidirectional long short-term memory network.

3. The method according to claim 1, wherein
   for each pixel point in the current road image, a first sequence to be inputted into the first recurrent neural network is formed by an output result of the convolutional neural network for the pixel point and output results of the convolutional neural network for pixel points in a neighborhood of the pixel point; and
   for each pixel point in the current road image, a second sequence to be inputted into the second recurrent neural network is formed by an output result of the deconvolution neural network for the pixel point and output results of the deconvolution neural network for pixel points in a neighborhood of the pixel point.

4. The method according to claim 1, wherein the deep learning model further comprises a third recurrent neural network,
   wherein a third sequence to be inputted into the third recurrent neural network is formed by results outputted by the second model device by processing a plurality of road images, wherein the plurality of road images comprise the current road image and road images recently acquired at different moments.

5. A device for detecting a road lane, comprising:
   a processor, and
   a memory, wherein
   the memory is configured to store a program code and transmit the program code to the processor; and
   the processor is configured to execute, in response to an instruction in the program code, the following steps:
   acquiring a current road image of a road in proximity of a vehicle; and
   inputting the current road image into a deep learning model and detecting a road lane region in the current road image based on a result outputted from the deep learning model,
   wherein the deep learning model is a model that has been trained based on correspondences between historical road images and known road lane regions in the historical road images,
   wherein the deep learning model comprises a first model device and a second model device, and an output of the first model device serves as an input of the second model device,
   wherein the first model device comprises at least one first model subdevice, the first model subdevice comprises a convolutional neural network and a first recurrent neural network, and an output of the convolutional neural network serves as an input of the first recurrent neural network, and
   wherein the second model device comprises at least one second model subdevice, the second model subdevice comprises a deconvolution neural network and a second recurrent neural network, and an output of the deconvolution neural network serves as an input of the second recurrent neural network.

6. The device according to claim 5, wherein each of the first recurrent neural network and the second recurrent neural network is a bidirectional long short-term memory network.

7. The device according to claim 5, wherein
   for each pixel point in the current road image, a first sequence to be inputted into the first recurrent neural network is formed by an output result of the convolutional neural network for the pixel point and output results of the convolutional neural network for pixel points in a neighborhood of the pixel point; and
   for each pixel point in the current road image, a second sequence to be inputted into the second recurrent neural network is formed by an output result of the deconvolution neural network for the pixel point and output results of the deconvolution neural network for pixel points in a neighborhood of the pixel point.

8. The device according to claim 5, wherein the deep learning model further comprises a third recurrent neural network,
wherein a third sequence to be inputted into the third recurrent neural network is formed by results outputted by the second model device by processing a plurality of road images, wherein the plurality of road images comprise the current road image and road images recently acquired at different moments.

9. A non-transitory storage medium that stores a program code for executing the following steps:
acquiring a current road image of a road around a vehicle; and
inputting the current road image into a deep learning model and detecting a road lane region in the current road image based on a result outputted from the deep learning model,
wherein the deep learning model is a model that has been trained based on correspondences between historical road images and known road lane regions in the historical road images,
wherein the deep learning model comprises a first model device and a second model device, and an output of the first model device serves as an input of the second model device,
wherein the first model device comprises at least one first model subdevice, the first model subdevice comprises a convolutional neural network and a first recurrent neural network, and an output of the convolutional neural network serves as an input of the first recurrent neural network, and
wherein the second model device comprises at least one second model subdevice, the second model subdevice comprises a deconvolution neural network and a second recurrent neural network, and an output of the deconvolution neural network serves as an input of the second recurrent neural network.

10. The non-transitory storage medium according to claim 9, wherein each of the first recurrent neural network and the second recurrent neural network is a bidirectional long short-term memory network.

11. The non-transitory storage medium according to claim 9, wherein
for each pixel point in the current road image, a first sequence to be inputted into the first recurrent neural network is formed by an output result of the convolutional neural network for the pixel point and output results of the convolutional neural network for pixel points in a neighborhood of the pixel point; and
for each pixel point in the current road image, a second sequence to be inputted into the second recurrent neural network is formed by an output result of the deconvolution neural network for the pixel point and output results of the deconvolution neural network for pixel points in a neighborhood of the pixel point.

12. The non-transitory storage medium according to claim 9, wherein the deep learning model further comprises a third recurrent neural network,
wherein a third sequence to be inputted into the third recurrent neural network is formed by results outputted by the second model device by processing a plurality of road images, wherein the plurality of road images comprise the current road image and road images recently acquired at different moments.

\* \* \* \* \*